United States Patent [19]

Schlig et al.

[11] Patent Number: 5,101,266
[45] Date of Patent: Mar. 31, 1992

[54] SINGLE-SCAN TIME DELAY AND INTEGRATION COLOR IMAGING SYSTEM

[75] Inventors: Eugene S. Schlig, Somers; Ying L. Yao, Millwood, both of N.Y.

[73] Assignee: International Business Machines Corporation, Armonk, N.Y.

[21] Appl. No.: 626,798

[22] Filed: Dec. 13, 1990

[51] Int. Cl.⁵ .............................................. H04N 9/10
[52] U.S. Cl. ........................................ 358/75; 358/53; 358/54
[58] Field of Search .................................. 358/53-54, 358/48, 75-76, 214-216, 213.13, 213.29

[56] References Cited

U.S. PATENT DOCUMENTS

| | | | |
|---|---|---|---|
| 4,093,976 | 6/1978 | Das | 358/53 |
| 4,663,656 | 5/1987 | Elabd | 358/48 |
| 4,835,601 | 5/1989 | Kobayashi | 358/53 |
| 5,023,711 | 6/1991 | Erhardt | 358/54 |
| 5,025,313 | 6/1991 | Parulski et al. | 358/54 |

*Primary Examiner*—Stephen Brinich
*Attorney, Agent, or Firm*—Ratner & Prestia

[57] ABSTRACT

An electronic imaging system develops red, green and blue images of a document in a single pass of the document through the system. The system includes an image sensor which has three time delay and integration (TDI) sensor arrays. Each sensor array is configured to have two optically masked rows of charge coupled devices (CCD's) for every row of CCD's that is used for imaging. The sensor arrays are arranged so that the first row of imaging CCD's on any two successive arrays are separated by a distance of an integer, K, times three times the height of a picture element (pel) of the image of the document that is projected onto the image sensor, plus or minus one pel height. The spectral component of the image of the document that is projected onto the image sensor is changed in sequence from red, to green, to blue. As the spectral component projected onto the image sensor is changed, the image of the document is scanned down the image sensor by a distance of one pel height. By this scheme, each line of pels in the document is imaged in each of the sensor arrays in a respectively different spectral component. A document may be imaged in all three colors in a single pass through the system without having dedicated filters for each of the separate sensor arrays.

10 Claims, 5 Drawing Sheets

SINGLE-SCAN TIME DELAY AND INTEGRATION COLOR IMAGING SYSTEM

FIELD OF THE INVENTION

This invention relates generally to a system which captures high-resolution color images and in particular, to a line-sequential color imaging system which employs three time delay and integration (TDI) sensors to obtain a color image of a document.

BACKGROUND

Electronic color imaging systems generally capture three distinct spectral components of an image, for example, red, green and blue. Each of these components is represented by an electrical signal. In many applications, the separate electrical signals are sampled and digitized. If the image is to be stored, the digital samples may be written into a digital memory. The image may be reproduced by applying the three signals to a device which combines the colors represented by the three signals.

Sequential color imaging systems are well known. In these systems, a single image sensing device sequentially receives, for example, red, blue and green color information at a high rate relative to the rate at which the image is changing. If a document is moving during the imaging operation, The system must operate at relatively high frequencies since the document must be resolved into three distinct signals while it is held momentarily still.

Other existing systems use a single linear or time delay and integration (TDI) imaging device to capture three separate scans of a document, each taken with a separate filter in place near the lens. The imaging device generally resolves lines of picture elements (pels) and scans the image incrementally, line by line. Either the document, the entire system except the document, the imaging device or a system of mirrors may be moved to provide the scan.

The primary disadvantage of a system of this type is the time required for three scans at a given maximum output data rate. If the document must move while it is being scanned, it may be necessary to make three passes through the system to obtain all three images. These passes add to the time required to process the document and may present undesirable alignment problems.

One method of avoiding multiple passes is to use three separately packaged imaging devices together with a system of spectrally selective beam splitters and filters. In this system, a different spectral band is applied to each device. These systems are disadvantageous because they require expensive optical components and need precise alignment.

Multiple passes over the image may also be avoided by placing three imaging devices close together on a single chip or substrate arranged such that each device is exposed to light in a different spectral band. This may be done in several ways. According to a first method, the light from the illuminated image may be dispersed so that the different devices are simultaneously exposed to different spectral bands. This method requires a linear filament illuminator and expensive optical components. Moreover, this method makes inefficient use of its illuminator and is not suitable for scanners which move only the imaging device.

A second method employs a uniform illuminator but places different filters over the different imaging devices. This method is disadvantageous since it requires special technology to apply and align the filters to the devices.

A paper by Yao et al. entitled "A Spatial Image Separator for Color Scanning" SPIE Vol 809—Scanning Imaging Technology pp 52-54, March 1987, describes a single-pass TDI color imager which uses a single TDI array. This system requires relatively complex and, thus, expensive optical components.

U.S. Pat. No. 4,500,914 to Watanabe et al. relates to a color imaging array in which red, green and blue sensor elements are defined by a single charge coupled device (CCD) imaging array that is tessellated with respective red, green and blue filter elements.

U.S. Pat. No. 4,264,921 to Pennington et al. relates to a single-pass color imager having three TDI arrays which each receive different spectral illumination.

U.S. Pat. No. 4,628,350 to Aughton et al. concerns an imaging system in which a light beam is passed through a moving transparency, through a rotating filter element and onto a single linear imaging device. The rotating filter element sequentially passes light in three distinct spectral components. The light is converted into electrical signals by the single imaging device.

Aughton teaches the use of a single linear imaging device with rapidly changing spectral image components. The advantages of TDI imaging arrays over linear imagers are well known: higher effective sensitivity to light and greater spatial uniformity and fidelity in the captured image. In a single-pass imager, however, TDI arrays cannot be substituted for linear arrays in a straightforward manner. This is because TDI imaging arrays operate in a pipelined mode, containing an electronic representation of several image pel lines at all times. Thus, if known TDI arrays were substituted for the linear arrays, the three color images would be mixed together, preventing color image reproduction from the electronic output.

It is therefore an object of the present invention to combine the advantages of a single-pass color imager with those of TDI imagers.

SUMMARY OF THE INVENTION

The present invention is embodied in a system and method for generating multiple spectrum image of a document in a single scan. The system includes apparatus for sequentially applying radiation in N different spectral distributions to N sensors each of which has at least one line of pel sensing elements. The N sensors are arranged so that, as the document is scanned, the image of each line of pels, in each of the N spectral distributions, is projected onto the respective first through Nth sensor elements. Each of the N sensor elements provides a respective signal representing the line of pels as if illuminated by a light of a respectively different one of the N spectral distributions.

DETAILED DESCRIPTION OF EXEMPLARY EMBODIMENTS OF THE INVENTION

Overview

Although the invention is described in the context of a color imaging system in which an image of a scanned document is developed from three component primary color images, it is contemplated that it may be used to develop other types of multiple spectrum images. For example, it may be desirable to capture both a visible light image and an infra-red image of an object other than a document in a single scan or to capture a polychrome image and one or more monochrome images. One skilled in the art of designing imaging systems could readily adapt this invention to perform these functions.

The present invention is described in the context of a color imaging system suitable for use in an optical scanner or a color facsimile machine. In these systems, the document is moved through the machine in incremental steps. As the document is moved an image of at least a portion of the document moves across a sensor array.

The exemplary imaging system also includes a rotating disk having three optical filters designed to produce final captured images corresponding to the red, green and blue spectral bands defined by the Commission Internationale de L'Eclairage (CIE). The rotation of the disk is synchronized to the motion of the document so that, as each new line of pels is imaged onto the sensor array, it is illuminated by a different spectral component of the light.

The sensor array used in the described embodiments includes three TDI imaging devices. The basic operational principles of TDI imaging devices are described in U.S. Pat. No. 4,264,921 to Pennington et al., which is hereby incorporated by reference for its teachings concerning TDI imaging devices. In the exemplary embodiments of the invention, each of the three TDI devices has two masked lines of charge transfer elements for every unmasked line of pel sensing charge transfer elements. The shifting of pel signals through the pel sensing elements and masked elements of the parallel lines of charge transfer devices is also synchronized to the motion of the document. This synchronization insures that as each new line of pels is imaged onto the device, the charge packets representing the previously captured line are shifted to the next charge transfer element.

Figure 4A:
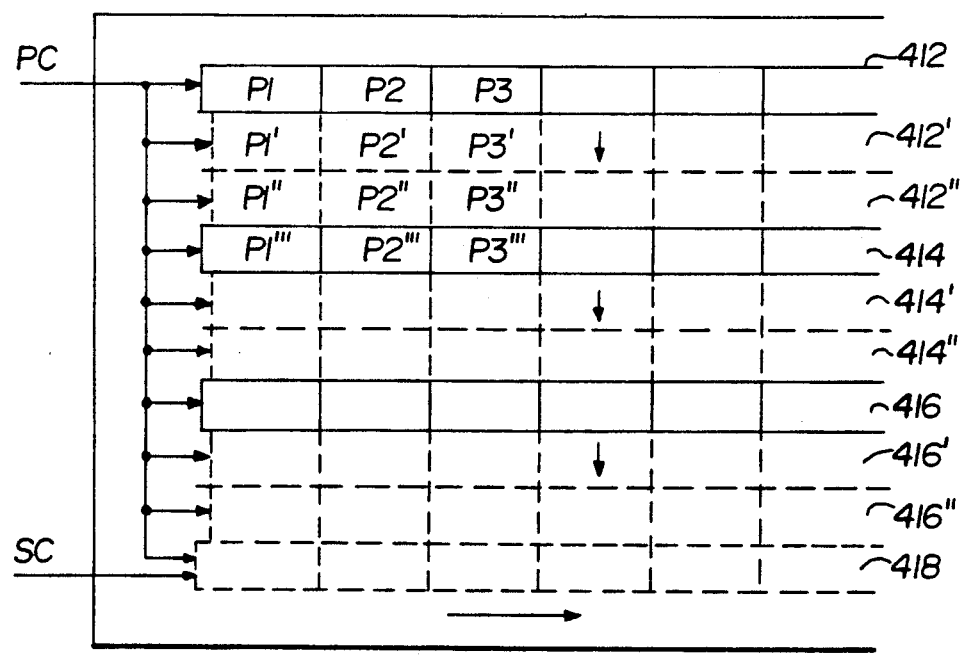
FIG. 4a is an expanded plan drawing of a portion of the sensor element shown in FIG. 4.
Figure 4:
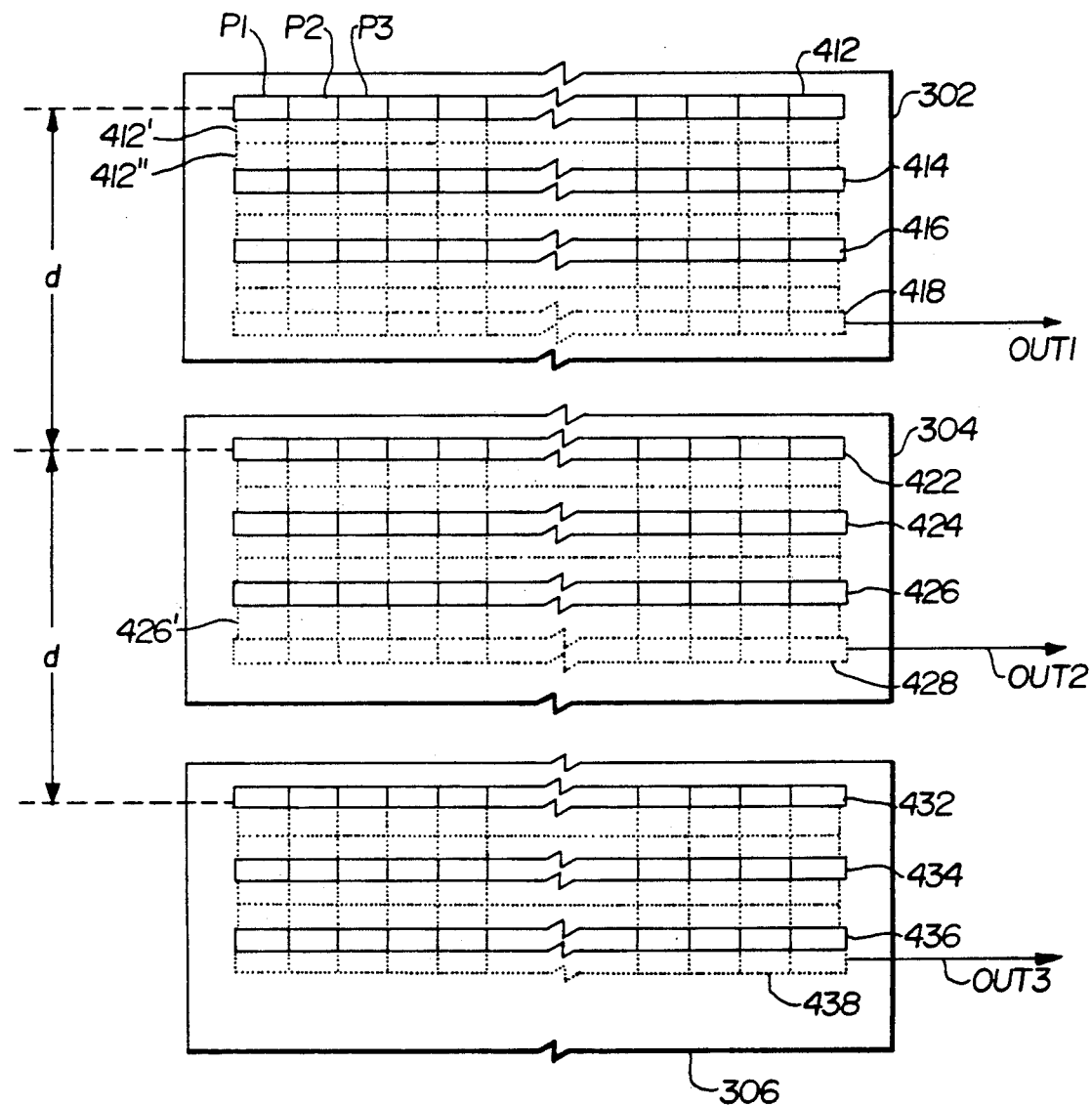
FIG. 4 is a plan drawing of the sensor element used in the imaging system shown in FIG. 1.

In the exemplary embodiments of the invention each TDI sensor includes three lines of pel sensing elements (e.g. lines 412, 414 and 416 of FIG. 4), separated from each other by two lines of masked charge transfer elements (e.g. lines 412' and 412" of FIG. 4). As the document is scanned, the charge accumulated in line 412 is shifted into lines 412', 412" and 414 in sequence. The scanning of the document and the shifting of pel samples through the TDI elements is synchronized so that, as each line of pel samples is shifted between successive lines of pel sensing elements (e.g. between lines 412 and 414), the respective sensing elements are illuminated by the same line of pels and the same spectral component. Thus, in the exemplary embodiment of the invention, the charge accumulated by the TDI device for each spectral component of each scanned line of pels is integrated over three exposure intervals.

As the pel samples are shifted out of the final line of pel sensing elements (e.g. 416) they are applied to a serial charge transfer shift register (e.g. 418) which rapidly shifts the entire line of samples as an analog signal (e.g. OUT1).

The three TDI sensors are arranged so that, as a line of pels from the document is applied to each of the sensors, it is illuminated by a different spectral component. Thus, for a given line of pels scanned from the document, its red spectral component is available at OUT1, later, its green component is available at OUT2 and later still, its blue component is available at OUT3. The different spectral signals are available at different times due to the time required to scan the line of pels over the sensors 302, 304 and 306.

Each of the sensors 302, 304 and 306 provides signals representing three different spectral components of any three successive lines of pels. For example, the sensor 302 may provide the red, green and blue components for respective successive lines L1, L2 and L3 while sensor 304 provides the green, blue and red components and sensor 306 provides the blue, red and green components, respectively. Thus all three color components of a line of pels are provided as the three lines are scanned across all three of the sensors.

DETAILED DESCRIPTION

Figure 1:
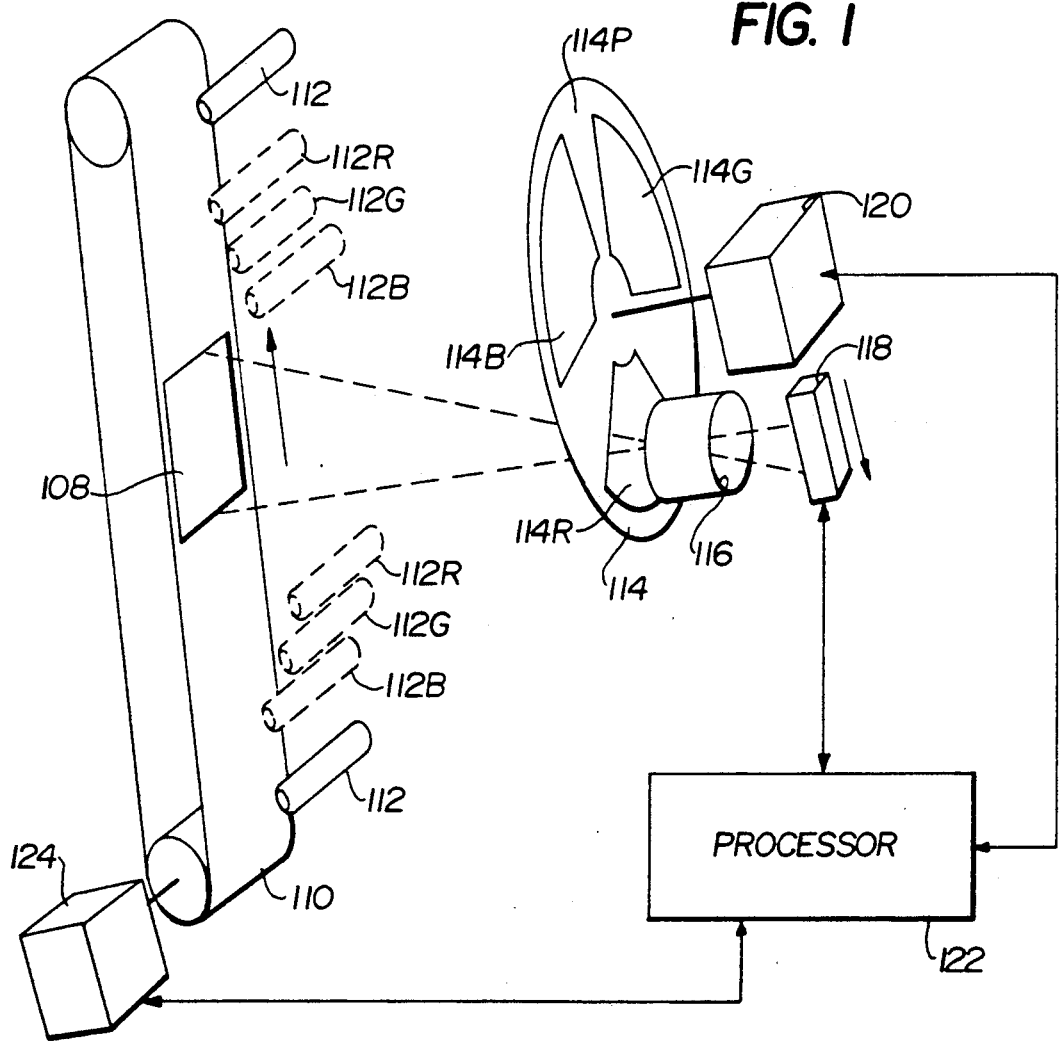
FIG. 1 is a perspective drawing partly in block diagram form which illustrates the configuration of key elements of the imaging system.

FIG. 1 is a perspective drawing, partly in block diagram form, of an optical imaging system which includes an embodiment of the present invention. In FIG. 1, control and data gathering functions performed by a processor 122 are accomplished via bidirectional connections to the processor, illustrated in block diagram form.

As shown in FIG. 1, a document 108 is moved through the imaging system on a belt 110. The motion of the belt is governed by a motor 124 which is responsive to control signals provided by the processor 122. In the exemplary embodiment of the invention, the motor 124 may be, for example, a stepper motor having a relatively large number of steps per revolution (e.g. 200). Upon receiving a signal from the processor 122, the exemplary motor 124 advances one step, causing an incremental movement of the belt and thus, the document on the belt. The rate at which step signals are provided by the processor 122 determines the speed of the motor 124.

In a first exemplary embodiment of the invention, the document is illuminated by two lamps 112 which may be, for example, conventional quartz halogen lamps. Light from the illuminated image of the document 108 is passed through a filter element 114R of a rotating color wheel 114 and is projected by a lens system 116 onto an imaging array 118. The lens system 116 may be any of a number of conventional lens systems which do not produce significant distortion in the image as it is scanned across the imaging array 118.

The exemplary color wheel 114 has three filters 114R, 114G and 114B, which approximate the spectral distribution shapes required for imaging the respective red, green and blue CIE color spectra. These filters are separated by opaque areas 114P. The filters are shown shaped as sectors of a disk by way of example only. The color wheel is turned by a motor 120 to expose the imager 118 to different spectral components at different times. In the exemplary embodiment of the invention, the motor 120 is a stepper motor which is controlled by a pulse train provided by the processor 122. In the example, filter wheel 114 is shown in front of the lens 116. As a matter of design choice, it may, alternatively, be placed between the lens 116 and the imager 118.

In a second exemplary embodiment of the invention, the lamps 112, color wheel 114 and stepper motor 120 are replaced by three sets of lamps 112R, 112G and 112B which emit red, green and blue light, respectively. Each of these lamps is controlled by the processor 122 to sequentially illuminate the document 108, and thus the image of the document on the imaging array 118, with the different spectral components.

As indicated by the arrows next to the belt 110 and imaging array 118, as the document moves along the belt in an upward direction in the FIGURE, the image of the document moves across the imaging array 118 in a downward direction. In the exemplary embodiment of the invention, the imaging array contains three sensor arrays which are composed of charge-coupled devices (CCD's) operated in time delay and integration (TDI) mode. The imaging array 118 is described below in greater detail with reference to FIGS. 4 and 4a.

The TDI sensor arrays on the imaging array 118 capture images of lines of pels from the document 108 as photocharge packets. The amount of charge in a packet represents the brightness of the associated pel. Each line of pels corresponds to a fine horizontal line of the document 108. In this embodiment of the invention, the processor 122 applies a four-phase parallel clock signal to the TDI arrays on the imaging array 118. In response to each cycle of the four-phase clock, the charge packets in one line are shifted downward in the direction of the image motion. In the exemplary embodiment of the invention, each line of the image contains 2048 pels and each pel corresponds to a square on the document having an area of approximately 0.00003 square inches. Correspondingly, each line of sensors in the imaging array contains 2048 elements.

In this embodiment of the invention, the processor 122 synchronizes the motion of the belt 110 and of the color wheel 114 to the parallel clock signal applied to the imaging array. For each cycle of the parallel clock signal the document on the belt is moved so that the image of the document advances vertically by one pel position on the imager 118. Also, for each pulse of the parallel clock signal the color wheel rotates to position the next filter between the lens and the document. The motion of the belt and the shifting of captured charge in the TDI arrays are timed to occur when the lens is blocked by one of the opaque regions, 114P of the color wheel 114. As set forth below, each color component of each line on the document may be imaged several times as it is scanned across the imager. The amount of charge accumulated for each pel position of the line is proportional to the amount of time that the line is imaged.

When a line of pels has been captured and integrated by the TDI sensor, it is shifted out as an analog signal in response to a serial clock signal supplied to the sensor array 118 by the processor 122. This analog signal is a time sequence of accumulated charge packets representing a line of pels in the document.

Since the sensor array 118 includes three TDI sensors, it is continuously providing three analog signals. In the exemplary embodiment of the invention, the three sensor arrays are configured to provide, at any instant, signals representing three different color spectra. For example, during one cycle of the parallel clock signal the three sensor arrays may provide red, green and blue color signal components, respectively, while in the next parallel clock cycle they may provide blue, red and green, respectively. These signals are resolved into separate red, green and blue images by the processor circuitry described below with reference to FIG. 3.

The sensor arrays provide respectively different color signals at any given time because the number of masked lines of charge transfer elements between the bottom row of imaging elements and the serial register are different for the three arrays. These masked lines delay each output line by one parallel cycle. Thus, varying the delay in each array changes the relationship between the output signals. If, for example, each array had the same delay, all three arrays would simultaneously provide output signals for the same color.

Figure 2A:
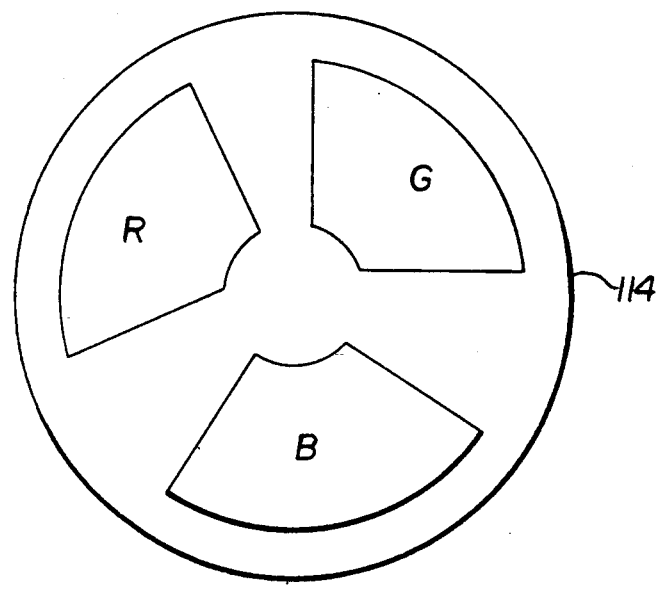
FIGS. 2A-2C are plan drawings which illustrates the structure of two optical filters suitable for use in the imaging system shown in FIG. 1.

FIG. 2a is a plan diagram of the color wheel 114 shown in FIG. 1. This color wheel includes three filters, one each having a spectral distribution which, when combined with the spectral content of the lamps and the spectral response of the imager, corresponds to the red, green and blue CIE color spectra. These exemplary filters, however, produce only rough approximations of the respective CIE spectral bands which are shown in FIG. 2c. As shown in this FIGURE, the blue spectral band $\bar{z}$ has a peak at 450 nanometers (nm), the green spectral band $\bar{y}$ has a peak at 540 nm and the red spectral band has two peaks, one at 600 nm and one at 435 nm. The peak at 435 nm is at approximately the same wavelength as the peak of the blue spectral filter. The red filter 114R in the exemplary color wheel 114 ignores the effect of the blue peak on spectral transmission. Accordingly, while this filter may provide an adequate translation of color from a document to an electronic image, this translation is not as accurate as it could be.

Figure 2B:
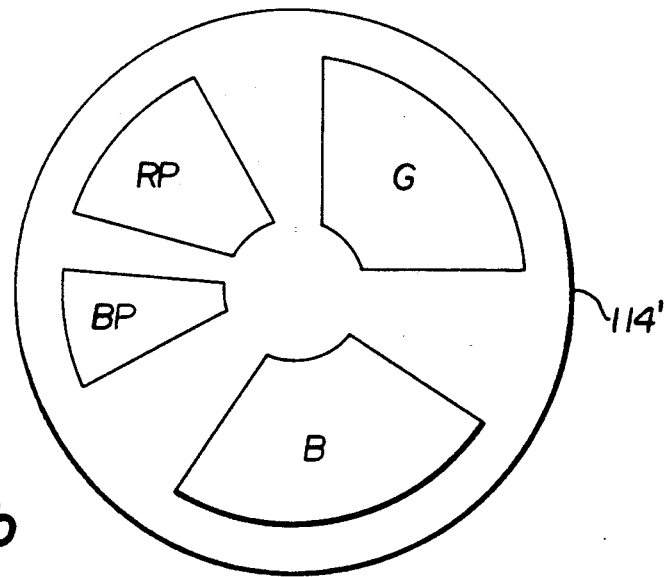
Figure 2C:
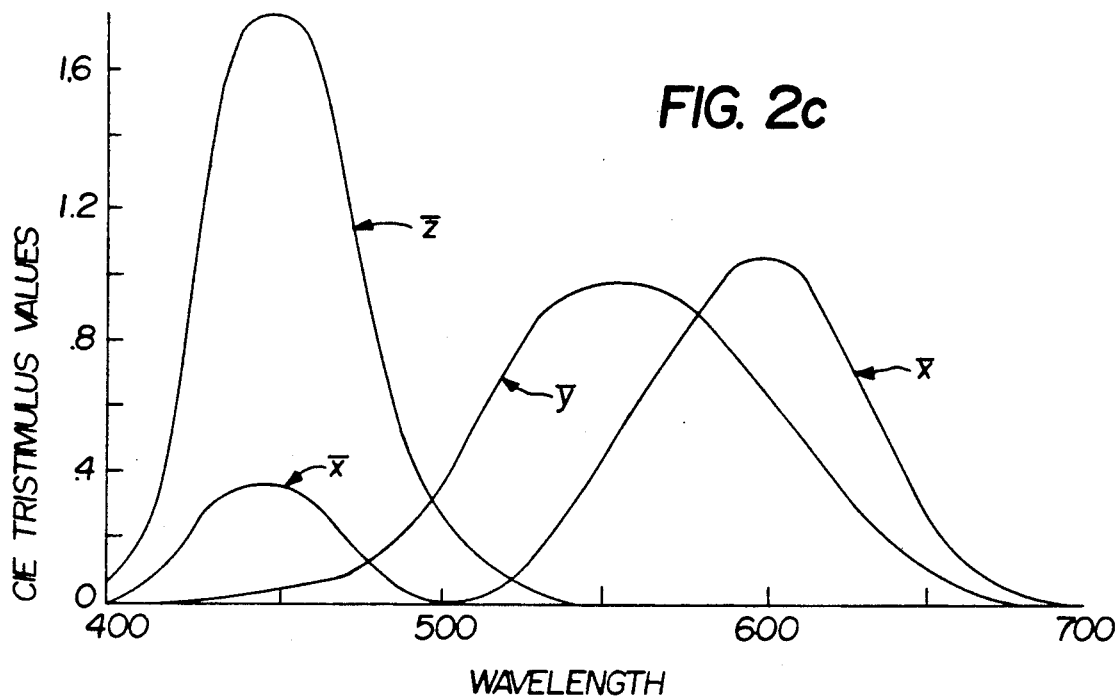

Greater accuracy in the transmission spectrum of the red filter may be achieved by adding a fourth filter to the color wheel, as shown in FIG. 2b. In this wheel, the red filter 114R is replaced by two smaller filters 114RP and 114BP. The filter 114RP has a transmission spectrum which approximates the peak of the $\bar{x}$ CIE tristimulus curve at 600 nm. The transmission spectrum of the filter 114BP is a reduced-amplitude version of the $\bar{z}$ tristimulus curve. This approximates the peak of the $\bar{x}$ curve at 435 nm. The inventors have found this to be a good approximation of the double-peak $\bar{x}$ transmission spectrum.

In the exemplary embodiment of the invention, the red peak filter 114RP is smaller than the red filter 114R shown in FIGS. 1 and 2a. This filter provides acceptable performance, however, since the TDI sensors exhibit greater sensitivity to light at the red end of the spectrum than to light at the blue end of the spectrum. In operation, the imaging array 118 would be exposed light from both of the filter elements 114RP and 114BP during a single cycle of the parallel clock signal PC. The array 118 would only be exposed to light from one of the filter elements 114G and 114B respectively during each of the next two successive clock cycles.

Although the wheel 114 is shown as only having one filter element of each color, it is contemplated that an alternative wheel may have multiple filter elements of each color. This would be advantageous since it would allow the speed of the stepper motor 120 to be reduced, since all of the filter elements could be inserted between the document and the imaging array 118 is a portion of the rotational period of the motor.

As shown in FIG. 1, the lamps 112, color wheel 114 and stepper motor 120 may be replaced by three sets of filtered light sources 112R, 112G and 112B which are individually activated by the processor 122 at times corresponding to the illumination of the image by the filters in the wheel 114 in the embodiment described above. In this alternative embodiment, the blue peak of the $\bar{x}$ CIE tristimulus curve may be approximated by briefly activating the blue light source during the time interval in which the red light source is activated.

Figure 3:
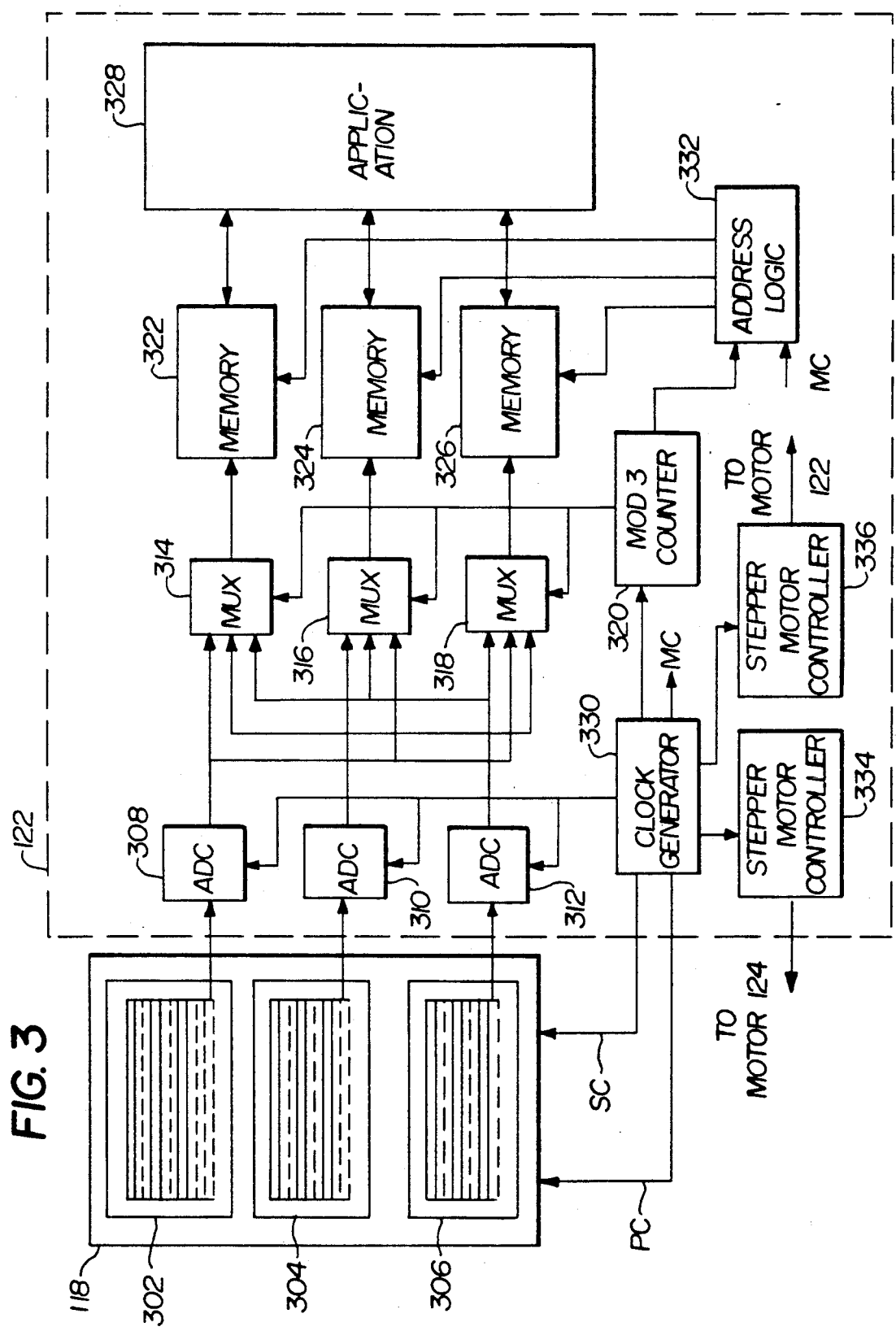
FIG. 3 is a block diagram which shows how the imaging system shown in FIG. 1 may be used.

FIG. 3 is a block diagram which shows details of the imaging array 118 and of the components of the processor 122 which send control signals to, and receive data from the imaging array 118. As described above, the imaging array 118 includes three component TDI arrays 302, 304 and 306. These arrays are described below, in greater detail, with reference to FIGS. 4 and 4a.

A clock generator circuit 330 provides parallel clock signals, PC, and serial clock signals, SC, to each of the component TDI arrays of the imaging array 118. It is understood that PC and SC each symbolically represent multiple conductors conveying multiple clock signals to the parallel and serial registers of the imaging arrays. For example, PC may comprise four parallel phases and a parallel-to-serial interface phase, while SC may comprise four serial phases, a set phase and a reset phase. All serial phases and all parallel phases have respective common frequencies. In this embodiment of the invention, the signals PC and SC have frequencies of approximately 4 KHz and 8 MHz, respectively. The exemplary clock generator circuit 330 also provides clock signals to stepper motor controllers 334 and 336 which control the belt stepper motor 124 and color wheel stepper motor 122, respectively. In addition, the clock generator provides other clock signals, described below, which are used by components of the processor 122. By controlling the frequency and phase of these clock signals, the processor 122 synchronizes the motion of the belt 110, the color wheel 114 and the shifting of packets through the TDI sensor arrays as described above.

Each of the component TDI arrays 302, 304 and 306 provides an analog output signal to a respective analog-to-digital converter (ADC) 308, 310 and 312. Each analog output signal is generated by serially shifting 2048 charge packets, representing a line of pels, from the array synchronous with the signal SC.

The ADC's 308, 310 and 312 each receive, from the clock generator 330, a clock signal having the same frequency as the signal SC but with a phase determined by the analog output signal. In response to this signal, the ADC's 308, 310 and 312 generate digital values representing the respective analog charge packets provided by the imaging arrays 302, 304 and 306, respectively. Each of the ADC's 302, 304 and 306 provides the digital values that it produces to three multiplexers 314, 316 and 318. Each digital value is in the form of eight parallel bits. In this example this signal is shown as a single path for clarity.

The multiplexers 314, 316 and 318 are all coupled to receive a two-bit control signal from a modulo-three counter 320. The clock input signal to the counter 320 is provided by the clock generator 330 and has substantially the same frequency as the parallel clock signal PC. As shown in FIG. 3, the multiplexer 314 is configured to pass the signal provided by the ADC's 308, 310 and 312 when the values provided by the counter 320 are 0, 1 and 2, respectively. For these values, the multiplexer 316 is configured to pass the values provided by the respective ADC's 310, 312 and 308, while multiplexer 318 is configured to pass the values provided by the ADC's 312, 308 and 310.

In this configuration, the samples provided by each multiplexer represent a separate color component of the image. Which color component is passed by which multiplexer depends on the synchronization of the color wheel 114 to the clock signal PC. In the exemplary embodiment of the invention, the color wheel rotates to expose the sensor array to red, green and blue light in succession. Thus, with the proper phasing of the two-bit control signal, the exemplary multiplexers 314, 316 and 318 provide red, green and blue sample values, respectively.

The samples provided by the multiplexers 314, 316 and 318 are applied to respective digital memory arrays 322, 324 and 326. Each of these memories has sufficient capacity to hold samples representing an entire document. In the exemplary embodiment of the invention, where the document 108 may be 11 by 14 inches and where each pel represents a square on the document having an area of 0.00003 square inches and 256 greyscale values, the exemplary memory arrays each contain more than 5,000,000 bytes (5 MB) of data storage.

The memory arrays 322, 324 and 326 include conventional dual-port random access memory (RAM) elements. Data may be stored into these RAMs in response to a first set of address signals, provided by address logic 332, while stored data is independently read from the arrays in response to a second set of address signals, provided by application circuitry 328. This application circuitry may be, for example a conventional color facsimile transmission system.

Due to the configuration of the imaging array 118, if red samples representing one line of pels (e.g. L1) are provided by the TDI sensor array 302, red samples for the next two lines on the document (e.g. L2 and L3) are provided by the sensor arrays 304 and 306, respectively. Not only are these lines of samples provided by different sensor elements but, in this embodiment of the invention, they are delayed, respectively, by 15 and 30 cycles of the parallel clock signal PC with respect to the line of samples provided by the sensor element 302.

In addition to the above considerations for generating address values for successive lines of samples of a single color, other considerations exist for generating address values for the different color components of a single line of samples. Using the line L1 described above, if the TDI sensor array 302 provides the red samples for line L1, the sensor array 304 provides the green samples and sensor 308 provides the blue samples with respective delays of 14 and 28 cycles of the signal PC.

To handle this addressing scheme, the exemplary address logic 332 is coupled to receive a clock signal, MC, having substantially the same frequency as the serial clock signal SC. In addition, the address logic 332 receives the counter value provided by the counter 320 to the multiplexers 314, 316 and 318. The exemplary logic circuitry 332 contains three address counters (not shown), one for each of the memories 322, 324 and 326 and stores three address values (not shown) for each memory. The address value that is loaded into a particular counter is determined from the signal provided by the modulo 3 counter 320. All three of the counters in the address logic 332 are incremented synchronously with the clock signal MC.

The circuitry shown in FIG. 4 assumes that the various sensor arrays, 302, 304 and 306 simultaneously provide signals representing different spectral components. If, as set forth above, the sensor arrays are identical and, so, provide signals representing the same spectral components, the memory 322 would be segmented differently requiring changes in the address logic 332. One skilled in the art of designing image processing circuitry can readily design suitable circuitry to handle the signals provided by the alternative sensor arrays.

FIG. 4 is an expanded plan view of the sensor array 118 shown in FIGS. 1 and 3. FIG. 4a is a further expansion of a portion of the sensor array 302. These two FIGURES are used to describe the configuration and operation of the imaging array 118.

As described above, the imaging array 118 includes three component TDI sensor arrays, 302, 304 and 306. Sensor array 302 has three lines of 2048 pel imaging cells (412, 414 and 416) which accumulate charge when exposed to light. The imaging cells in lines 412 and 414 are separated by two lines of masked cells, 412' and 412". These masked cells are not light sensitive and merely act as two stages each of 2048 parallel CCD shift registers, which pass the charge packets from the line 412 to the line 414. There are also two lines of masked cells between the pel imaging cells in the line 416 and a 2048 stage parallel input serial output CCD shift register 418.

FIG. 4a is a plan diagram of a portion of the TDI array 302. The array includes three rows of imaging cells, 412, 414 and 416. Each of the rows of imaging cells is separated from the next row by two rows of masked cells (e.g. 412' and 412"). The parallel clock signal PC, includes, in this embodiment, four phase signals which are applied to all of the masked and unmasked rows of cells. The four-phase clock signal acts to transfer charge packets, in parallel, from one row of the TDI array to the next. The exemplary signal PC also includes a parallel-to-serial transfer phase. The discussion that follows describes the operation of the TDI array in terms of time intervals defined by successive cycles of the signal PC.

During a first cycle of this signal, the charge packets P1, P2 and P3 are accumulated while row 412 is exposed to, for example, a line, L1 of pels from the document illuminated by red light (at the same time other charge packets are being accumulated in rows 414 and 416 by exposure to other lines of the document, also in red light). These charge packets are transferred to row 412' to become the packets P1', P2' and P3' at the start of the next cycle. During this time interval, the line of pels L1 is focused on row 412' and the entire imaging array is exposed to green light. The amount of charge in the packets held in row 412' is substantially unchanged during this cycle because the effect of light on the masked row of cells of row 412' is negligible.

During the next cycle, the packets P1', P2' and P3' are transferred from the masked row 412' to the masked row 412" to become the packets P1", P2" and P3". During this interval the pels of line L1 are focused on the row 412" and the imaging array 118 is exposed to blue light. As with row 412', the amount of charge in the packets P1", P2" and P3" remains substantially constant; there is no contribution from the blue light.

In the next cycle, the packets P1", P2" and P3" are transferred into the imaging cells of row 414, becoming P1''', P2''' and P3'''. The pels of line L1 are then focused on the row 414 and the array 118 is again illuminated by red light. During this interval, the light shining on the imaging cells increases the charge in packets P1''', P2''' and P3'''.

During the next two cycles of the signal PC, the charge packets representing the pels of line L1 are transferred through the cells 414' and 414". In the next subsequent cycle, charge is again accumulated in the packets while they reside in the imaging cells of row 416 and are exposed to line L1 in red light. These charge packets are then transferred through the rows 416' and 416" in the next two cycles.

Upon leaving the row 416", at the start of the next cycle, the accumulated charge packets are transferred, in parallel, into a parallel input, serial output shift register 418 by the parallel-to-serial phase of the clock signal PC. During that cycle, these charge packets are shifted out of the shift register 418 in response to the 8 MHz clock signals, SC. The set and reset phases of the signal SC aid in the generation of the analog output signal from the serial register.

It is noted that, at any time, charge packets reside in all elements of each array so that the operations described above are occurring simultaneously throughout the imaging array.

The structure of the component TDI arrays 304 and 306 is the same as the array 302 except for the number of rows of masked cells between the last imaging line and the output shift register. In the array 304, only one row of masked cells is present between the last line of pel imaging cells, 426 and output shift register 428. In the TDI array 306, the output shift register 438 is coupled directly to the last line of imaging cells, 436 with no intervening rows of masked cells.

The number of lines of cells is different for the different TDI arrays to ensure that no two arrays will simultaneously provide samples of the same spectral component. As described above, all of the TDI arrays are simultaneously exposed to each of the three spectral components and all of the arrays are responsive to the clock signal PC to transfer the accumulated charge packets in each line to the next successive line. Thus, if all of the TDI arrays had the same number of lines then they would all simultaneously provide samples of the same spectral component at the output ports of their respective serial shift register stages. In the configuration shown in FIG. 4, while the TDI array 302 is providing red spectral samples at its output terminal, the arrays 304 and 306 are providing green samples and blue samples, respectively.

The individual TDI arrays 302, 304 and 306 are arranged on the sensor array 118 so that the distance d between the first line of imaging cells on any two successive arrays is a multiple of the spacing represented by three lines of cells (imaging and non-imaging) plus the spacing represented by one additional line. As a practical design consideration, it is desirable that the spacing be large enough to permit electrical connections to the individual arrays 302, 304 and 306. In the exemplary embodiment, the distance d is equivalent to 16 line widths (5*3+1). In other embodiments of the invention where each TDI cells (11 imaging lines and 22 masked lines), a distance d of 52 line widths may be more appropriate. As an alternative, the distance d may be equivalent to a multiple of three line spacings, minus one line spacing. In FIG. 4, the spacing between the arrays is not shown to scale.

This arrangement of the respective TDI sensor arrays ensures that each line of pels is imaged in each of the three color spectra, red, green and blue. As set forth above, the motion of the belt is synchronized to the motion of the color wheel and the parallel clock signal PC so that for each cycle of the signal PC, the image of the document is moved vertically down the imager by one pel position and the color wheel is rotated to expose the imaging array to a different spectral component. Using this scheme, each unmasked row of imaging elements is exposed to the same lines of pels for a given spectral component. For example, when line 412 is exposed to a line of pels L1 in red light, lines 414 and 416 will also be exposed to the same line of pels in red light respectively 3 and 6 cycles of the signal PC after line 412 is exposed.

As the image of the document is scanned down the imaging array 118, if a given line L1 is exposed in red light on the imaging lines of the TDI array 302, it is exposed in green light on the imaging lines of the TDI array 304 and in blue light on the imaging lines of the TDI array 306. Thus, every line of pels in the document is imaged in all three spectral components.

In the exemplary embodiment of the invention, there are delays of 15 and 30 cycles of the signal PC between the time that the line of pels in one spectral component is provided by the TDI array 302 and the times that the other two spectral components of the line are provided by the respective TDI arrays 304 and 306. These delays would increase if each of the TDI arrays used more rows of cells or if the spacing between successive TDI arrays were increased.

While the described embodiments of the invention use TDI sensor arrays, it is noted that linear image sensors (not shown) may be substituted for the TDI arrays. In this alternative embodiment, three linear image sensors would be placed in the same relative positions on the sensor array 118 as described above. Each successive pair of linear sensors would have the spacing between their lines of imaging cells as described above. This configuration of linear sensors would allow the use of a lower data rate from each sensor than in the imaging apparatus set forth in the above referenced Aughton patent.

While this invention has been described in terms of an exemplary embodiment, it is understood that it may be practiced as outlined above within the scope of the attached claims.

The invention claimed is:

1. A system for capturing multiple spectral components of an image of an object as a matrix of picture elements (pels) comprising:
   image sensing means, including M sensor elements, where M is an integer, for simultaneously generating M electrical signals representing M lines of pels, respectively, from the image of the object;
   imaging means for projecting the image of the object onto said image sensing means;
   scanning means for scanning the image of the object across said image sensing means;
   spectral control means for changing spectral components of the image of the object that are projected onto said image sensing means from among N spectral components, where N is an integer not less than M; and
   control means for synchronizing the spectral control means and the scanning means such that, as a line of pels from the image of the object is scanned across said image sensing means once, images of at least M of said N spectral components of the line are projected onto the M sensing elements, respectively.

2. The system of claim 1 wherein the M sensor elements of said image sensing means include M respective time delay and integration (TDI) sensor arrays, each of said TDI sensor arrays including multiple rows of image sensing elements, wherein:
   each row of image sensing elements is configured to sense a line of pels from the projected image of the object; and
   each row of image sensing elements is separated from the next row of image sensing elements by M−1 rows of optically masked charge transfer elements.

3. The system of claim 2 wherein:
   each pel of the projected image of the object has a predetermined height, $H_s$; and
   the respective first rows of image sensing elements on successive ones of said M sensor elements are separated by a distance, D, which is defined by the equation $D = [(K*M)+1]*H$, where K is an integer.

4. The system of claim 2 wherein:
   each pel of the projected image of the object has a predetermined height, $H_s$; and
   the respective first rows of image sensing elements on successive ones of said M sensor elements are separated by a distance, D, which is defined by the equation $D = [(K*M)-1]*H$, where K is an integer.

5. The system of claim 1 wherein:
   the spectral control means is responsive to said control means to change the spectral component of the image of the object that is projected onto the image sensing means at respective regular time intervals each having a duration of T; and
   the scanning means is responsive to the control means to scan the image of the document across the image sensing means by a distance substantially equal to H during the time T.

6. The system of claim 1 wherein the spectral control means includes:
   means for simultaneously illuminating the object with polychromatic radiation including said multiple spectral components; and
   filter means including N filter elements, disposed between the object and the image sensing means, for successively filtering radiation reflected from the object which is imaged onto the image sensing means through at least M of said N filter elements.

7. The system of claim 6 wherein said filter means includes a color wheel having three filter elements which approximate respective red, green and blue CIE tristimulus spectra.

8. The system of claim 7 wherein the filter element which approximates the red CIE tristimulus spectrum includes a first filter having a transmission spectrum with exhibits a peak transmission for light waves having a wavelength of approximately 600 nm and a second filter having a transmission spectrum which approximates the blue CIE tristimulus spectrum.

9. The system of claim 1 wherein the spectral control means includes means for sequentially illuminating the object with each of said respective multiple spectral components.

10. In an imaging system including an image sensor array including M sensor elements, where M is an integer, a method of capturing multiple spectral components of an image of an object as a matrix electrical signals representing picture elements (pels), comprising the steps of:

a) projecting the image of the object onto the image sensor array;

b) scanning the projected image of the object across the sensor array;

c) changing the spectral component of the image projected onto the image sensor array from among N spectral components, where N is an integer not less than M;

d) synchronizing steps b) and c) so that, as a line of pels from the image of the object is scanned across the image sensor array once, images of at least M of the N spectral components of the line of pels are projected onto the M sensor elements, respectively.

* * * * *